Aug. 2, 1966 R. SHOTTENFELD ETAL 3,263,953
VIBRATION ISOLATION MOUNT
Filed April 30, 1963

INVENTORS
RICHARD SHOTTENFELD
SOLOMON ABILOCK
BY Paul Maleson
ATTORNEY

United States Patent Office 3,263,953
Patented August 2, 1966

3,263,953
VIBRATION ISOLATION MOUNT

Richard Shottenfeld, Jamaica, and Solomon Abilock, Brooklyn, N.Y., assignors to Pilot Radio Inc., Yonkers, N.Y., a corporation of New York
Filed Apr. 30, 1963, Ser. No. 276,819
4 Claims. (Cl. 248—358)

This invention relates to a vibration isolating device. More particularly, it relates to a vibration isolating device particularly suitable for mounting phonograph turntables.

It is highly desirable to mount a phonograph turntable or a phonograph record changer on a base, cabinet or frame in such a way as to obtain a high degree of isolation from vibrations in the base, cabinet, frame, or other surface on which it rests. This invention is specifically directed to a new mounting means. In common use, three of four of the suspension devices of the present invention are used to support a changer or turntable.

The isolation from vibration of the turntable or changer is of particular importance in high fidelity phonograph systems. This problem is further intensified when a high fidelity system is supplied in a console in which the turntable or changer, the electronic components, and the loudspeakers are all in one cabinet unit. The reason for this intensification of the problem is explained more fully below.

Two difficult problems in high quality reproduction from high fidelity consoles are spurious vibrations of the stylus caused by vibration transmission from shaking floors, and by feedback from the loudspeakers to the stylus transmitted by vibrations in the structure of the cabinet which are set up by motion of the loudspeaker cones and consequent motion of air masses. Undesirable effects of such feedback include high intermodulation distortion, rumble, and even sustained oscillations. The spurious vibrations induced in the stylus because of loudspeaker vibration are herein called acoustic feedback.

Presently known expedients to reduce acoustic feedback include limiting the power output to a relatively low value, reducing the low frequency response of the system, and increasing the rigidity of the cabinet by bracing to reduce flexure. Limitation of power output or frequency response is not consistent with the requirements of high fidelity sound reproduction. Increased cabinet bracing becomes expensive, heavy, unwieldy, and is not completely effective.

The most promising way to reduce acoustic feedback is to improve the isolation of the changer or turntable by suitable mounts, which also reduces the effect of floor vibrations. Mounts of various types are known, such as those disclosed for example in U.S. Patent No. 3,044,784.

In modern record changers, the effective mass of the tone arm and its cartridge, and the stylus compliance comprise a mechanical system having a fundamental resonance at a subsonic frequency. The remaining part of the phonograph changer, including the turntable proper, its spindle, motor, the record changing mechanism and the plate on which they are mounted (but excluding the base or cabinet) comprises another mechanical system. The first mentioned system is herein called the tone arm system, and the second mentioned system is herein called the turntable-changer system. If the turntable-changer system is supported by compliant mounts so that its fundamental resonant frequency is substantially lower than the fundamental resonant frequency of the tone arm system, the tone arm system and the turntable-changer system will move substantially as one unit; there will be little relative motion between the stylus and the turntable-changer system, and therefore a minimizing of spurious signals introduced into the high fidelity system.

It is apparent that significant vibrations in the turntable-changer system include vertical, horizontal or combination vibrations. The commonly used vibration mount in such applications today are conical springs. Turntables are generally mounted in a horizontal plane, and the conical springs are arranged with their longitudinal axes vertically. Conical springs are much stiffer transversely than they are along their longitudinal axes.

The conical springs thus have more compliance vertically than they do horizontally. The resulting fundamental resonant frequency for the turntable-changer system is thus higher in the horizontal plane than it is vertically. The loudspeaker cones move horizontally and produce a corresponding horizontal component in the shelf, cabinet, base, frame or other support for the record changer. Thus, it will be appreciated that the desired end of reducing the fundamental resonant frequency of the turntable-changer system is not approached in an optimum manner by providing conical springs in an environment in which a large component of the acoustic feedback is horizontal.

The use of conical springs however, and more particularly conical springs mounted vertically in the common manner is nevertheless important. As the weight on the mounts changes, as by changing the number of records resting on the turntable, the natural fundamental resonant frequency of the system would change, unless the rate (load-deflection ratio) remains constant. The rate of a conical spring increases as it is compressed, because it increases its stiffness due to the fact that the larger diameter coils are taken out of action as the load increases. Such patents as U.S. Patent No. 2,610,017 demonstrate this fact. The present invention therefore provides a novel solution to apparently conflicting problems.

It is an object of this invention to provide a vibration isolator.

It is an object of this invention to provide a vibration isolating means adapted for use in a phonograph.

It is another object of this invention to provide a vibration isolator and damping means between a phonograph turntable or changer and its base.

Another object of this invention is to provide a mount for a phonograph changer, said mount comprising a conical spring having one end thereof bearing against a hollow elastic member.

Other aims and objects of this invention are made apparent in the following specification and claims.

The invention is best understood in connection with the accompanying drawings in which like reference numerals refer to like parts and in which.

Figure 1:
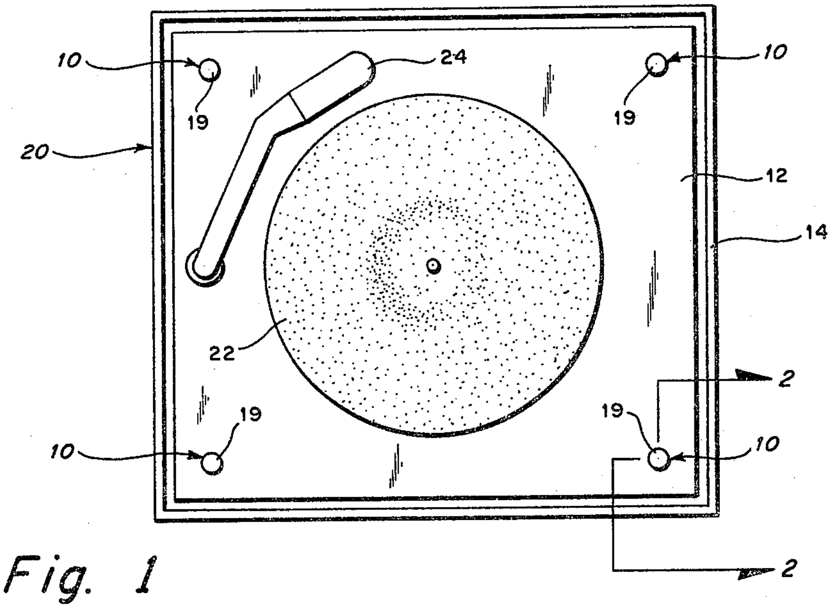
FIGURE 1 is a plan view of a phonograph turntable assembly.

FIGURE 1 shows a typical environment for the mount of this invention. A phonograph generally designated 20 is shown from above. This phonograph 20 may variously be identified as the phonograph assembly, the turntable, or the phonograph changer. The embodiment shown in FIGURE 1 is that of a simple phonograph, not an automatic changer type, since the principles of this invention are valid and may be described in connection with this simple form of phonograph. Of course, the more common field of use of this invention lies with automatic changer phonographs.

A mounting plate 12 is provided. On this plate 12 a tone-arm, cartridge, stylus assembly 24 is mounted in the normal manner. For convenience, this assembly 24 may be referred to as the tone-arm. A turntable platen 22 is provided mounted for rotation in the normal manner on plate 12. A base, cabinet or frame 14 surrounds and supports the mounting plate 12 and the elements carried on the mounting plate. This support is effected by means of mounts generally designated 10 as shown, four of these mounts 10 are provided, although it is understood that a lesser or greater number may be used.

Figure 2:
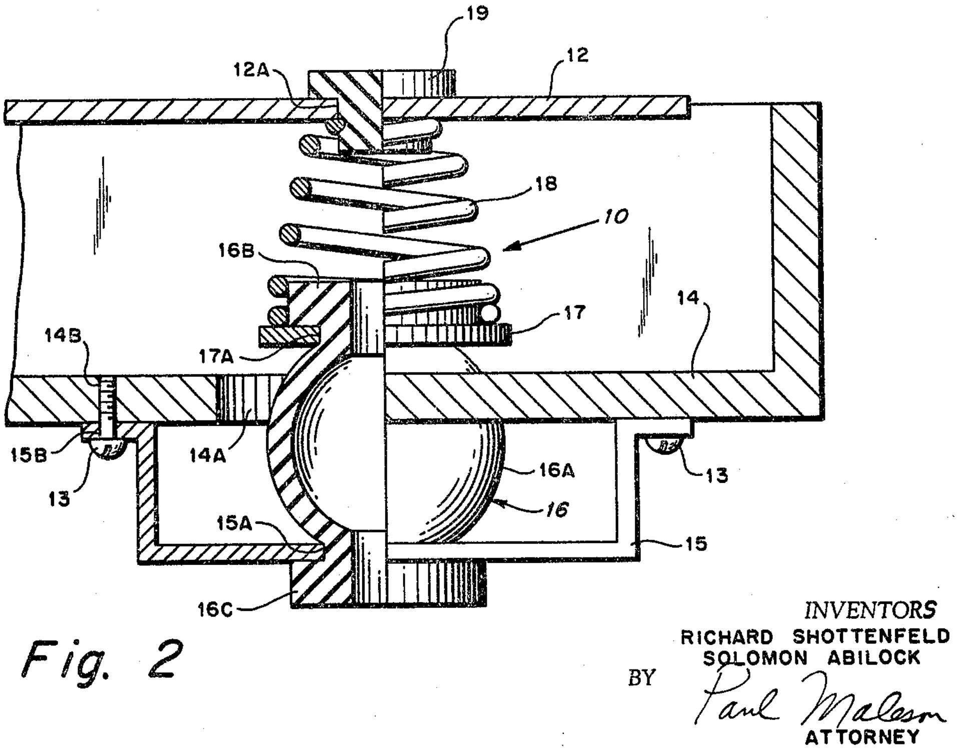
FIGURE 2 is an elevation view, partly in cross-section taken along line 2—2 of FIGURE 1, showing a mount.

The structure of mount 10 is better understood in connection with FIGURE 2. It comprises a conical spring 18. As shown in its preferred and common embodiment, this conical spring is a helix of spring material, generally steel, having successive coils of generally increasing diameter toward the bottom of the spring. A hollow elastic member generally designated 16 is provided. This member has a major portion of its walls solid and closed. The member 16 includes a lower mounting means 15A, 16C and an upper mounting means 17A, 16B. More particularly, in the embodiment shown, the lower mounting means comprises a short cylindrical extension 15A terminating in a flange 16C, and the upper mounting means comprises a short cylindrical extension 17A terminating in a flange 16B. The central or active portion of the hollow elastic member 16 is preferably substantially a hollow sphere 16A. This sphere is preferably closed except for openings at the top and bottom through the upper and lower mounting means respectively. While the active portion of elastic member 16 is described as substantially a sphere, it will be appreciated that departures from this preferred configuration can be made without departing from the spirit of this invention. For example, it could tend to the configuration of an oblate spheroid or a prolate spheroid. It could tend toward a cylindrical or even prismatic configuration, although the configuration specifically illustrated and described is preferred as having the best characteristics. As this configuration is further departed from, the advantages of the mount decrease. The member 16 can be and preferably is molded integrally. It is generally and preferably made of rubber, which can be natural or synthetic. It is apparent that other elastic materials approaching the general physical characteristics of rubber may be used.

A washer or seat 17 is provided around the short cylindrical extension 17A. The washer 17 has an inner diameter small enough so that it is retained by flange 16B, and an outer diameter large enough and extending beyond flange 16B so as to provide a seat for conical spring 18. As shown, the diameter of upper flange 16B is such that it snugly fits inside the lowest coil or coils of spring 18, thus positioning the spring.

The frame or base 14 is provided with a hole 14A to accommodate the mount 10 with clearance. A bracket 15 is secured to frame 14 as shown. The securing means may be screws 13, each screw fitting through a hole 15B in bracket 15, and into a hole 14B in frame 14. A bracket 15 is rigid, generally being made of metal or a rigid plastic. A hole in the bracket 15 accommodates the lower short cylindrical extension 15A, as shown. The flange 16C retains the member 16 in the bracket. Securing means are provided to rigidly secure the top of spring 18 to the mounting plate or chassis plate 12. The securing means comprises, in the embodiment shown, a stud 19 extending through a hole 12A in the plate, having an expanded upper head and fitting into the upper coils of conical spring 18.

This combination of a conical spring resting on a seat attached to the elastic hollow sphere provides an unexpected advantage over the use of these elements separately. The merit of the elastic sphere is that it provides a high degree of horizontal compliance as well as vertical compliance, and also introduces a desirable damping function into the mount. The merit of the conical spring element in the mount has been described above. It has been found that the combination of the spring and sphere as described produces a much better result than if either of these elements were used separately or even if they were both used but not combined substantially as shown. For instance, if the mounting plate rested on conical springs which were supported on an intermediate board, and this board in turn were supported on hollow spheres, the desirable vibration isolation would not be nearly as good as that obtained by the present direct connection between the spring and the sphere. The reason is that when the intermediate board is used, the lower surface of the spring and the surface of the elastic member flanges are constrained to be parallel to one another. On the other hand, in the embodiment shown and described, the seat 17 resting on the elastic member 16 is free to tilt, as are the lower coils of the spring 18. Under a horizontal vibration component, this tilt can take place, with an increase in the horizontal compliance of each element, the spring and the sphere and thus an improvement in the total compliance of the mount 10.

The scope of this invention is to be determined by the appended claims and is not intended to be limited by the specific embodiment shown and disclosed, which is illustrative.

We claim:

1. A vibration isolation mount comprising: a hollow elastic member having a wall, a major portion of said wall being solid, said major portion having a generally spherical configuration, upper and lower mounting means on said member, said upper mounting means including an upper short cylindrical extension, a seat around said extension, and an upper flange retaining said seat, said lower mounting means including a lower short cylindrical extension, and a lower flange on said lower extension, a rigid bracket to support said vibration isolation mount, said rigid bracket having a hole therethrough, said hole fitting around said lower short cylindrical extension above said lower flange and below said major portion of said wall, a conical helical spring having a lower end and an upper end, said lower end being seated on said upper mounting means, securing means on said upper end of said spring, said securing means being adapted to attach said spring to a mass to be isolated.

2. A vibration isolation mount as set forth in claim 1 wherein said upper and lower mounting means are rubber and are integral with said hollow elastic member, and said seat is a washer firmly positioned around said upper short cylindrical extension and below said upper flange.

3. A vibration isolation mount as set forth in claim 2 wherein said conical helical spring is positioned to taper to a smaller diameter upwardly away from said washer.

4. A vibration isolation mount as set forth in claim 3 wherein said bracket is provided with means to fasten it to a support.

References Cited by the Examiner

UNITED STATES PATENTS

| | | | |
|---|---|---|---|
| 347,281 | 8/1886 | Vose | 248—358 X |
| 1,372,991 | 3/1921 | Beadle | 248—21 |
| 2,172,004 | 9/1939 | Anderson | 248—24 |
| 2,765,141 | 10/1956 | Applegate | 248—358 |
| 2,849,201 | 8/1958 | Schelgunov | 248—24 |
| 3,047,297 | 7/1962 | Drake | 274—39 |
| 3,059,882 | 10/1962 | Staar | 248—20 |
| 3,074,681 | 1/1963 | Kerley | 248—358 |
| 3,103,364 | 9/1963 | Mocks et al. | 274—39 |

FOREIGN PATENTS

| | | |
|---|---|---|
| 606,616 | 12/1934 | Germany. |
| 511,737 | 8/1939 | Great Britain. |

CLAUDE A. LE ROY, *Primary Examiner.*

NORTON AMSHER, JOHN PETO, C. B. PRICE, *Assistant Examiners.*